US011347532B2

(12) United States Patent
Simoncelli

(10) Patent No.: US 11,347,532 B2
(45) Date of Patent: *May 31, 2022

(54) HOT-SWAPPING STORAGE POOL BACKEND FUNCTIONAL MODULES

(71) Applicant: Red Hat, Inc., Raleigh, NC (US)

(72) Inventor: Federico Simoncelli, Fano (IT)

(73) Assignee: Red Hat, Inc., Raleigh, NC (US)

(*) Notice: Subject to any disclaimer, the term of this patent is extended or adjusted under 35 U.S.C. 154(b) by 366 days.

This patent is subject to a terminal disclaimer.

(21) Appl. No.: 16/374,903

(22) Filed: Apr. 4, 2019

(65) Prior Publication Data
US 2019/0227837 A1    Jul. 25, 2019

Related U.S. Application Data

(63) Continuation of application No. 14/626,455, filed on Feb. 19, 2015, now Pat. No. 10,310,880.

(60) Provisional application No. 62/084,425, filed on Nov. 25, 2014.

(51) Int. Cl.
*G06F 9/455* (2018.01)
*G06F 16/958* (2019.01)
*G06F 16/11* (2019.01)

(52) U.S. Cl.
CPC ........ *G06F 9/45558* (2013.01); *G06F 16/119* (2019.01); *G06F 16/972* (2019.01); *G06F 2009/45579* (2013.01); *G06F 2009/45583* (2013.01)

(58) Field of Classification Search
CPC ... G06F 9/45558; G06F 16/119; G06F 16/972
See application file for complete search history.

(56) References Cited

U.S. PATENT DOCUMENTS

| | | | |
|---|---|---|---|
| 6,654,830 B1 | 11/2003 | Taylor et al. | |
| 7,565,503 B2 | 7/2009 | Fujibayashi | |
| 8,201,161 B2 | 6/2012 | Challener et al. | |
| 8,478,845 B2 | 7/2013 | Agarwala et al. | |
| 9,244,971 B1* | 1/2016 | Kalki | G06F 16/24542 |
| 9,336,131 B1 | 5/2016 | Sabjan et al. | |
| 2008/0244705 A1 | 10/2008 | Cromer et al. | |
| 2009/0083541 A1 | 3/2009 | Levine | |

(Continued)

FOREIGN PATENT DOCUMENTS

CN    101430670 B    6/2010

OTHER PUBLICATIONS

Kadav, Asim et al., "Live Migration of Direct-Access Devices", Computer Science Department, University of Wisconsin-Madison, Nov. 3, 2008 pp. 1-10 http:/fstatic. us en ix.org/legacy/events/wiov08/tech/full_papers/kadav/kadav_html/.

(Continued)

*Primary Examiner* — Tammy E Lee
(74) *Attorney, Agent, or Firm* — Lowenstein Sandler LLP

(57) ABSTRACT

Systems and methods for hot-swapping storage pool backend functional modules of a host computer system. An example method may comprise: identifying, by a processing device of a host computer system executing a virtual machine managed by a virtual machine manager, a storage pool backend functional module; and activating the identified storage pool backend functional module by directing, to the identified storage pool backend functional module, backend storage function calls.

19 Claims, 10 Drawing Sheets

(56) References Cited

U.S. PATENT DOCUMENTS

| | | |
|---|---|---|
| 2009/0187604 A1 | 7/2009 | Guo et al. |
| 2011/0126197 A1 | 5/2011 | Larsen et al. |
| 2012/0144391 A1 | 6/2012 | Ueda |
| 2013/0031341 A1 | 1/2013 | Ganti et al. |
| 2013/0117746 A1 | 5/2013 | Henderson et al. |
| 2013/0227089 A1 | 8/2013 | McLeod et al. |
| 2014/0181027 A1 | 6/2014 | Whitehead et al. |
| 2014/0181039 A1 | 6/2014 | Harrison et al. |
| 2014/0267871 A1* | 9/2014 | Baek .................. H04N 5/2258 348/333.05 |
| 2014/0359623 A1 | 12/2014 | Kranendonk et al. |

OTHER PUBLICATIONS

Kumar, Sanjay et al., "Netchannel: a VMM-level Mechanism for Continuous, Transparent Device Access During VM Migration", Georgia Tech, Atlanta, GA 2008 2 pages http://dl.acm.org/citation.cfm?id=1346261.

USPTO, Office Action for U.S. Appl. No. 14/626,455, dated Mar. 15, 2017.

USPTO, Final Office Action for U.S. Appl. No. 14/626,455, dated Sep. 12, 2017.

USPTO, Office Action for U.S. Appl. No. 14/626,455, dated Dec. 27, 2017.

USPTO, Final Office Action for U.S. Appl. No. 14/626,455, dated Jun. 29, 2018.

USPTO, Advisory Action for U.S. Appl. No. 14/626,455, dated Dec. 5, 2017.

USPTO, Advisory Action for U.S. Appl. No. 14/626,455, dated Sep. 26, 2018.

USPTO, Notice of Allowance for U.S. Appl. No. 14/626,455, dated Jan. 14, 2019.

* cited by examiner

```
class StoragePoolBackendInterface(object):
71     """StoragePool Backend Interface Definition"""
72
73     def __is_secure__(self):
74         return False
75
76     @unsecured
77     def getSpmStatus(self):
78         """Return the current SPM information with the tuple (lVer, spmId)
79
80         This method is used from the StoragePool to get information about
81         the current SPM in the Pool. The special values LVER_INVALID and
82         SPM_ID_FREE are used when the values are either missing or just
83         initialized.
84         """
85         raise NotImplementedError()
86
87     def setSpmStatus(self, lVer=None, spmId=None):
88         """Set the current SPM information using the lVer and spmId values
89
90         This method is used from the StoragePool to set the information
91         about the current SPM in the Pool. The special value None is used
92         to mark any parameter that shouldn't be updated.
93         This request can be ignored from the backend.
94         """
95         raise NotImplementedError()
96
97     @unsecured
98     def getDomainsMap(self):
99         """Return a dictionary of domains in the pool
100
101         This method must return a dictionary representing the storage domains
102        statuses. The key represents the domain uuid and the status is one
103        of [DOM_ATTACHED_STATUS, DOM_ACTIVE_STATUS].
104        The dictionary must contain an entry for all the storage domains that
105        are currently attached to the pool.
106        """
107        raise NotImplementedError()
108
109    def setDomainsMap(self, domains):
110        """Set a dictionary of domains in the pool
111
112        This method is used from the StoragePool to set the map of domains in
113        the pool. For more information on the format see getDomainsMap.
114        """
115        raise NotImplementedError()
116
117    @unsecured
118    def getMaximumSupportedDomains(self):
119        """Return the maximum number of domains that can be attached
120
121        This method is used from the StoragePool to check how many domains
122        can be attached to the pool.
123        """
124        raise NotImplementedError()
125
```

FIG. 3A

```
126    @unsecured
127    def getMasterVersion(self):
128        """Return the master domain version
129
130        This method is used from the StoragePool to get the current version
131        of the information returned by the backend. It is used in particular
132        to check if the domains map is up to date.
133        """
134        raise NotImplementedError()
135
136    @unsecured
137    def validateMasterDomainVersion(self, masterDomain, masterVersion):
138        """Valideate the master domain and version
139
140        This method is used from the StoragePool to ensure that the backend
141        is using the correct master and version. In case of a mismatch the
142        method should raise a StoragePoolWrongMaster exception.
143        """
144        raise NotImplementedError()
145
146    def setDomainRegularRole(self, domain):
147        """Set the domain role to regular
148
149        This method is used from the StoragePool to notify that a master
150        storage domain has been demoted to regular.
151        This request can be ignored from the backend.
152        """
153        raise NotImplementedError()
154
155    @unsecured
156    def initParameters(self, poolName, domain, masterVersion):
157        """Init the storage pool parameters
158
159        This method is used from the StoragePool generally upon creation
160        to set the initial storage pool parameters.
161        """
162        raise NotImplementedError()
163
164    def switchMasterDomain(self, curMasterDomain, newMasterDomain,
165                           newMasterVersion):
166        """Switch the master domain to a new domain
167
168        This method is used from the StoragePool to request the switch
169        of the master domain to a different domain with a new version.
170        """
171        raise NotImplementedError()
172
173    @unsecured
174    def getInfo(self):
175        """Return a dictionary of pool information
176
177        This method is used from the StoragePool to get the information
178        about the pool, the dictionary should include: {'name': ...,
179        'domains': ..., 'master_ver': ..., 'lver': ..., 'spm_id': ...}
180        """
181        raise NotImplementedError()
```

FIG. 3B

```
388 class StoragePoolMemoryBackend(StoragePoolBackendInterface):
389
390     __slots__ = ('pool', 'masterVersion', 'domainsMap')
391
392     log = logging.getLogger('Storage.StoragePoolMemoryBackend')
393
394     def __init__(self, pool, masterVersion, domainsMap):
395         self.pool = weakref.proxy(pool)
396         self.updateVersionAndDomains(masterVersion, domainsMap)
397
398     # Read-Only StoragePool Object Accessors
399
400     def __is_secure__(self):
401         return self.pool.isSecure()
402
403     @property
404     def spUUID(self):
405         return self.pool.spUUID
406
407     @property
408     def masterDomain(self):
409         return self.pool.masterDomain
410
411     # StoragePool Backend Interface Implementation
412
413     @unsecured
414     def getSpmStatus(self):
415         # FIXME: unify with StoragePoolDiskBackend
416         lVer, spmId = self.masterDomain.inquireClusterLock()
417         return lVer or LVER_INVALID, spmId or SPM_ID_FREE
418
419     def setSpmStatus(self, lVer, spmId):
420         self.log.debug(
421             'this storage pool implementation ignores the set spm '
422             'status requests (lver=%s, spmid=%s)', lVer, spmId)
423
424     @unsecured
425     def getDomainsMap(self):
426         return self.domainsMap
427
428     def setDomainsMap(self, domainsMap):
429         self.domainsMap = dict(
430             ((k, v.capitalize()) for k, v in domainsMap.iteritems()))
431         self.log.info(
432             'new storage pool master version %s and domains map %s',
433             self.masterVersion, self.domainsMap)
434
435     @unsecured
436     def getMaximumSupportedDomains(self):
437         return config.getint("irs", "maximum_domains_in_pool")
438
```

FIG. 4A

```
439  @unsecured
440  def getMasterVersion(self):
441    return self.masterVersion
442
443  @unsecured
444  def validateMasterDomainVersion(self, masterDomain, masterVersion):
445    if self.masterVersion != int(masterVersion):
446      self.log.error(
447        'requested master version %s is not the expected one %s',
448        masterVersion, self.masterVersion)
449      raise se.StoragePoolWrongMaster(self.spUUID, masterDomain.sdUUID)
450
451  def setDomainRegularRole(self, domain):
452    domain.changeRole(sd.REGULAR_DOMAIN)
453
454  @unsecured
455  def initParameters(self, domain, poolName, masterVersion):
456    self.log.debug(
457      'this storage pool implementation ignores master '
458      'domain initialization (sdUUID=%s, poolName="%s", '
459      'masterVersion=%s)', domain.sdUUID, poolName, masterVersion)
460
461  def switchMasterDomain(self, currentMasterDomain, newMasterDomain,
462                         newMasterVersion):
463    self.log.debug(
464      'switching from master domain %s version %s to master domain '
465      '%s version %s', currentMasterDomain.sdUUID, self.masterVersion,
466      newMasterDomain.sdUUID, newMasterVersion)
467    self.masterVersion = newMasterVersion
468
469  @unsecured
470  def getInfo(self):
471    lVer, spmId = self.getSpmStatus()
472    return {
473      'name': 'No Description',
474      'domains': domainListEncoder(self.domainsMap),
475      'master_ver': self.masterVersion,
476      'lver': lVer,
477      'spm_id': spmId,
478    }
479
480  # Backend Specific Methods
481
482  @unsecured
483  def updateVersionAndDomains(self, masterVersion, domainsMap):
484    self.log.debug('updating domain version to %s and domains map '
485                   'to %s', masterVersion, domainsMap)
486    self.masterVersion = masterVersion
487    self.setDomainsMap(domainsMap, __securityOverride=True)
```

FIG. 4B

HOT-SWAPPING STORAGE POOL BACKEND FUNCTIONAL MODULES

RELATED APPLICATIONS

This application is a continuation of U.S. patent application Ser. No. 14/626,455 filed on Feb. 19, 2015, which claims the benefit of U.S. Provisional Patent Application No. 62/084,425, filed Nov. 25, 2014. Both above-referenced applications are incorporated by reference herein.

TECHNICAL FIELD

The present disclosure is generally related to virtualized computer systems, and is more specifically related to virtual machine storage management.

BACKGROUND

Virtualization may be viewed as abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines. Processor virtualization may be implemented by the hypervisor scheduling time slots on one or more physical processors for a virtual machine, rather than a virtual machine actually having a dedicated physical processor. Memory virtualization may be implemented by employing a page table (PT) which is a memory structure translating virtual memory addresses to physical memory addresses.

BRIEF DESCRIPTION OF THE DRAWINGS

The present disclosure is illustrated by way of examples, and not by way of limitation, and may be more fully understood with references to the following detailed description when considered in connection with the figures, in which:

FIGS. 3A-3B schematically illustrate an example interface that may be implemented by a storage pool backend functional module in accordance with one or more aspects of the present disclosure;

FIGS. 4A-4B schematically illustrate example methods compliant with the specified interface, in accordance with one or more aspects of the present disclosure;

DETAILED DESCRIPTION

Described herein are methods and systems for hot-swapping storage pool backend functional modules of a host computer system.

A distributed computer system may comprise a plurality of host computer systems managed by a virtualization manager. Each host computer system may be communicatively coupled, via a network, to one or more storage domains that store disk images of virtual machines.

"Storage domain" herein refers to an atomic storage unit, such as a mount point or a folder for a file based storage, or a group of logical unit numbers (LUNs) for a block-based storage. "Storage pool" herein refers to a group of domains that are managed together.

In a centrally managed virtualized environment, each host computer may run a host management module (e.g., implemented by a daemon process) that manages and monitors various aspects of the host operation, including storage, memory and network interfaces. In certain implementations, the host management module may include one or more storage pool backend functional modules for managing the storage functions, including various functions related to storing the disk images of the virtual machines being executed by the host computer system. A storage pool backend functional module may be configured to implement a certain data format, by implementing one or more methods that are compliant to a pre-defined call interface.

In accordance with one or more aspects of the present disclosure, the storage pool backend functional modules may be hot-swapped in order to accommodate changes in the format in which the disk image data is stored by the physical storage components of one or more storage domains.

In certain implementations, a virtualization manager may select a host computer system to update the disk image data that is stored by the physical storage components of one or more storage domains, in order to make the data compliant with a certain data format. If the data format update on the physical storage components was successful, the virtualization manager may then notify one or more host computer systems that have their disk images stored by the physical storage components of one or more storage domains. Responsive to receiving a notification message comprising an identifier of a new storage pool backend functional module that supports the new data format, a host computer system may, transparently for the virtual machine being executed by the host computer system, hot-swap the storage pool backend functional modules.

Various aspects of the above referenced methods and systems are described in details herein below by way of examples, rather than by way of limitation.

Figure 1:
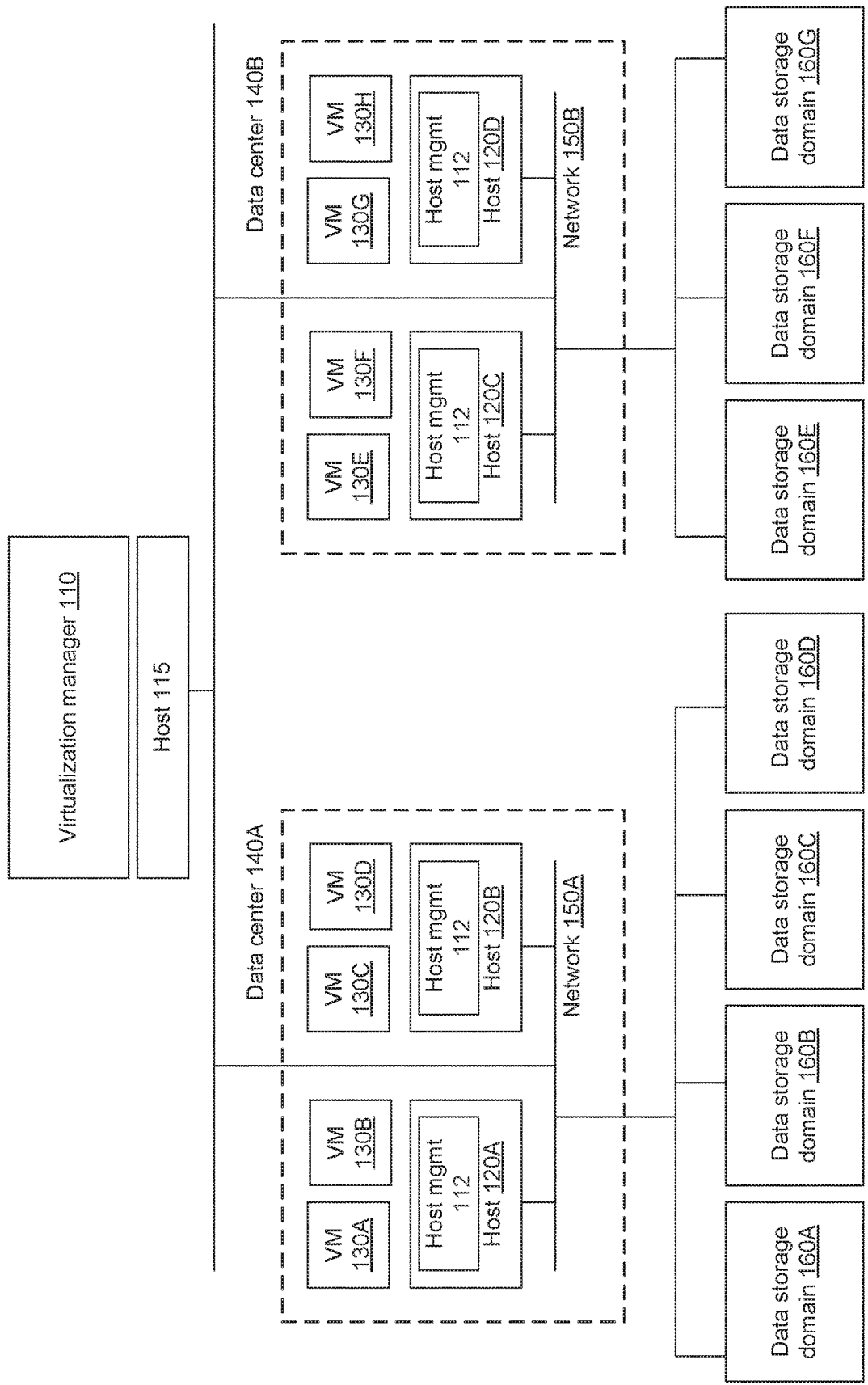
FIG. 1 depicts a high-level component diagram of one illustrative example of a distributed computer system 1000 representing a virtualized environment operating in accordance with one or more aspects of the present disclosure.

FIG. 1 depicts a high-level component diagram of one illustrative example of a distributed computer system 1000 representing a virtualized environment. In the illustrative example of FIG. 1, distributed computer system 1000 comprises a virtualization manager 110 and a plurality of host computer systems 120A-120D grouped into one or more logical groups which may be also referred to as "data centers" or "clusters" 140A-140B. Virtualization manager 110 refers to one or more software modules being executed by a host computer system 115 for centralized management of the virtualized environment. Virtualization manager 110 may comprise various interfaces, including administrative interface, reporting interface, and/or application programming interface (API) to communicate to host computers 120A-120D of the managed virtualized environment, as well as to user portals, databases, directory servers and various other components which are omitted from FIG. 1 for clarity.

Each of host computer systems 115, 120A-120D may comprise one or more processors communicatively coupled to memory devices and input/output (I/O) devices, as described in more details herein below with references to FIG. 7.

Each of host computer systems 120A-120D may run a plurality of virtual machines 130A-130H, by executing a hypervisor to abstract the physical layer, including processors, memory, and I/O devices, and present this abstraction to the virtual machines as virtual devices. A virtual machine 130 may execute a guest operating system which may utilize the underlying virtual devices, including virtual processors, virtual memory, and virtual I/O devices. One or more applications may be running on virtual machine 130 under the guest operating system.

In certain implementations, host computer systems 120A-120D may be grouped into one or more logical groups which may be also referred to as "data centers" 140A-140B. A data center may represent the highest level of abstraction in the virtualization model. Each data center 140 may be communicatively coupled, via a network 150, to one or more storage domains 160, including data storage domains 160A-160G. Data storage domains 160A-160G may store disk images of virtual machines 130.

Each host computer system 120 may run a host management module 210 that manages and monitors various aspects of the host operation, including the storage, memory and network interfaces. In an illustrative example, host management module 112 may be provided by a Virtual Desktop and Server Management (VDSM) daemon.

Figure 2:
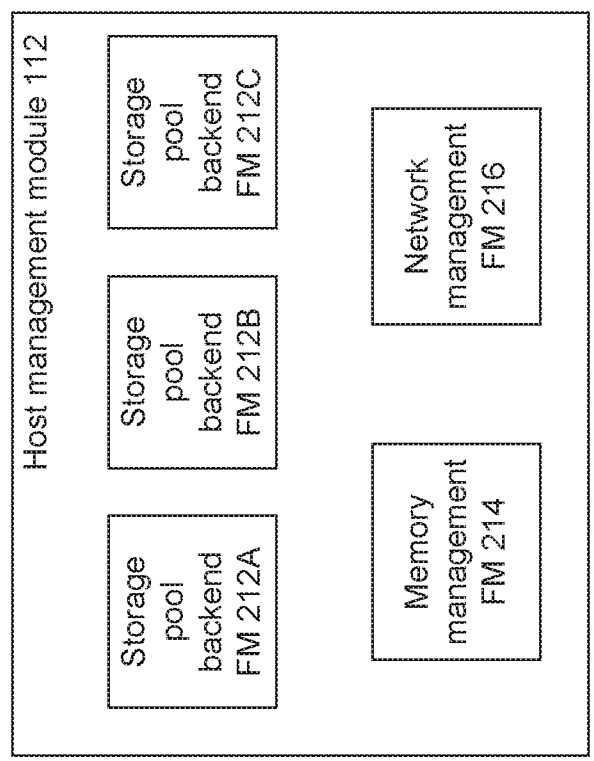
FIG. 2 schematically illustrates functional structure of a host management module, in accordance with one or more aspects of the present disclosure.

In certain implementations, host management module 112 may include one or more storage pool backend functional modules 212A-212C for managing the storage functions, including various functions related to storing the disk images of the virtual machines being executed by the host computer system, storing additional information (e.g., metadata), and exchanging messages between the hosts, as schematically illustrated by FIG. 2. In various illustrative examples, host management module 112 may also include a memory management functional module 214, a network management functional module 216, and/or various other functional modules that are not shown in FIG. 2.

Storage pool backend functional module 212 may be configured to implement a certain data format, by implementing one or more methods that are compliant to a pre-defined call interface. FIGS. 3A-3B schematically illustrate an example interface that may be implemented by a storage pool backend functional module in accordance with one or more aspects of the present disclosure. FIGS. 4A-4B schematically illustrate example method implementations compliant with the interface specified by FIGS. 3A-3B.

In accordance with one or more aspects of the present disclosure, storage pool backend functional modules 212 may be hot-swapped in order to accommodate changes in the format in which the disk image data is stored by the physical storage components of one or more storage domains. In an illustrative example, an active storage pool backend functional module 212A may be swapped with one of the standby storage pool backend functional modules 212B-212C, as described in more details herein below.

In certain implementations, a storage pool backend functional module is configured to store certain storage metadata in a memory of the host computer system and/or in one or more storage domains. The storage metadata may comprise values of various parameters related to the supported storage data format, storage connection pool, individual storage domains, etc. In order to support the hot-swapping mechanism operating in accordance with one or more aspects of the present disclosure, storage pool backend functional modules may limit the amount and/or the types of metadata items that are stored in the storage domains, as storing large amounts of metadata on the disk may significantly affect the efficiency of the storage pool backend functional modules hot-swapping, as metadata items of certain types may need to be re-calculated upon performing the hot-swapping operation.

In certain implementations, a storage pool backend functional module may be configured to store certain metadata items in the memory of the computer system, or, in some instances, perform on-demand calculation of metadata items of certain types, thus eliminating the need to store the metadata items in a persistent memory.

Figure 5:
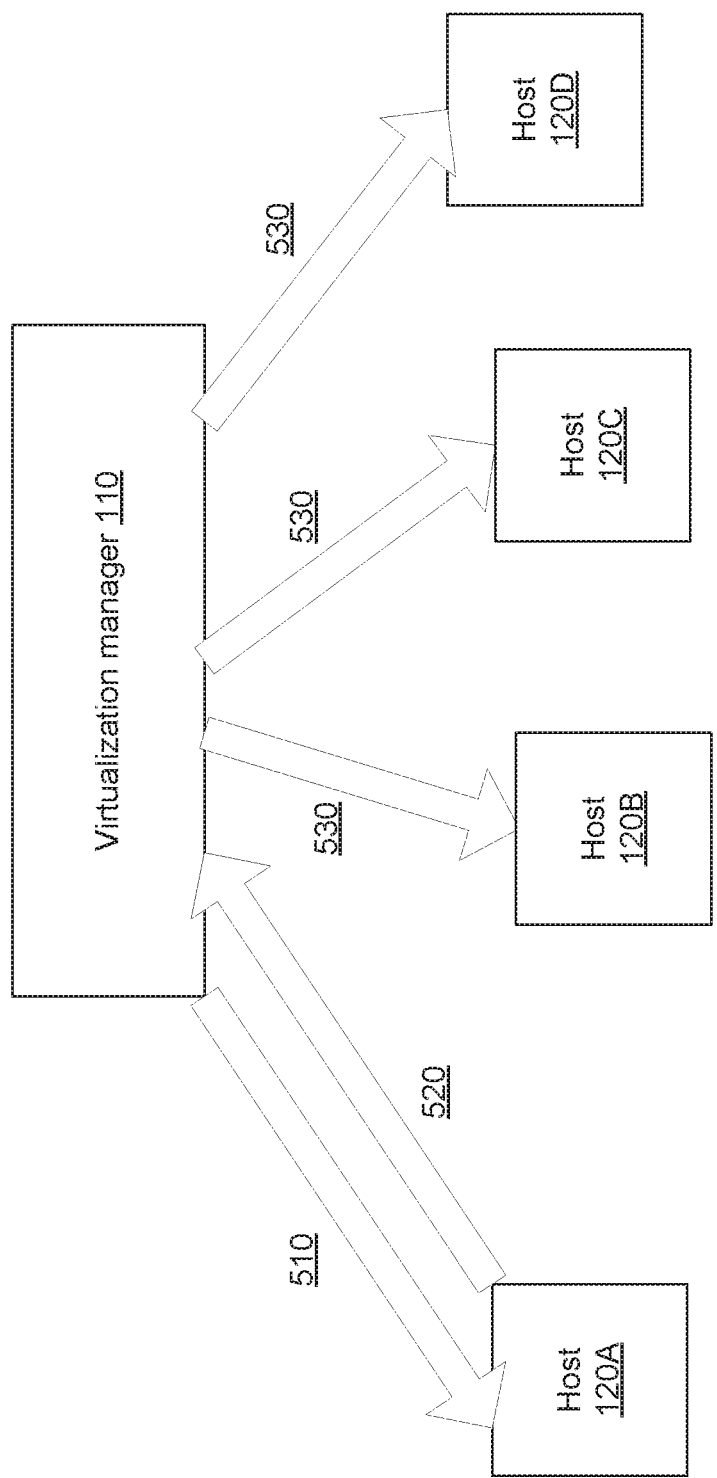
FIG. 5 schematically illustrates an example sequence of operations performed by the virtualization manager and one or more host computer system in order to update the data format of disk images and hot-swap storage pool backend functional modules running on one or more host computer systems, in accordance with one or more aspects of the present disclosure.

FIG. 5 schematically illustrates an example sequence of operations performed by virtualization manager 110 and one or more host computer systems 120 in order to update the data format of disk images and hot-swap storage pool backend functional modules running on one or more host computer systems 120. In certain implementations, virtualization manager 110 may initiate the data format update by selecting a host computer system 120A to update the disk image data, in order to make the data compliant with a certain data format. The new data format may be backward compatible with the current data format of the physical storage components of one or more storage domains. Virtualization manager 110 may send a message 510 to host computer system 120A instructing the host to update the disk image data to the new data format. Responsive to completing the data format update operations, host computer system 120A may notify the virtualization manager of the completion status by transmitting a message 520.

If the data format update on the physical storage components was successful, the virtualization manager may then notify one or more host computer systems 120 that have their disk images stored by the physical storage components of one or more storage domains. Responsive to receiving a notification message 530 comprising an identifier of a new storage pool backend functional module that supports the new data format, a host computer system 520 may, transparently for the virtual machine being executed by the host computer system, hot-swap the storage pool backend functional modules.

In an illustrative example, the host computer system may perform the hot-swapping operation by modifying pointers to certain functions implementing the storage pool backend functional module interface, in order to direct backend storage function calls to the standby storage pool backend functional module identified by the notification message.

Figure 6:
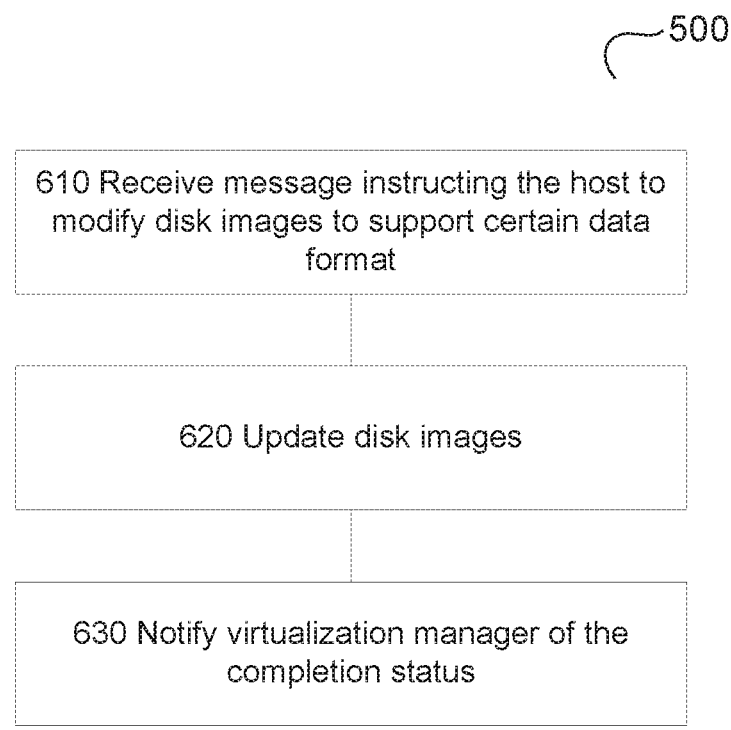
FIG. 6 depicts a flow diagram of a method for updating the data format of disk images stored by physical storage components of one or more storage domains, in accordance with one or more aspects of the present disclosure.

FIG. 6 depicts a flow diagram of a method for hot-swapping storage pool backend functional modules of a host computer system, in accordance with one or more aspects of the present disclosure. Method 600 and/or each of its individual functions, routines, subroutines, or operations may be performed by one or more processing devices (e.g., one or more processing devices of computer system 100 of FIG. 1) executing the method. In certain implementations, method 600 may be performed by a single processing thread. Alternatively, method 600 may be performed by two or more processing threads, each thread executing one or more individual functions, routines, subroutines, or operations of the method. In an illustrative example, the processing threads implementing method 600 may be synchronized (e.g., using semaphores, critical sections, and/or other thread synchronization mechanisms). Alternatively, the processing threads implementing method 600 may be executed asynchronously with respect to each other.

At block 610, a processing device implementing the method may receive, from the virtualization manager, a message instructing the host to modify, in view of a certain data format, one or more disk images stored by physical storage components of one or more storage domains.

At block 620, the processing device may modify the disk images in order to provide compliance to the identified data format. In certain implementations, modification of the disk images may involve modifying, adding or removing certain metadata items stored in one of the storage domains and/or within the memory of the host computer system.

At block 630, the processing device may transmit, to a virtualization manager, a message comprising the completion status of the data format modification, and the method may terminate.

Figure 7:
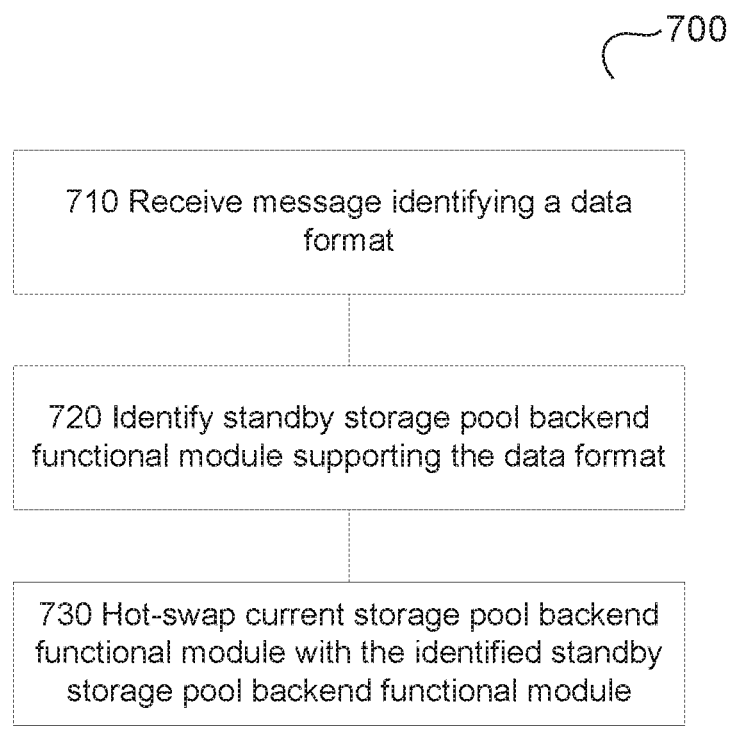
FIG. 7 depicts a flow diagram of a method for hot-swapping storage pool backend functional modules of a host computer system, in accordance with one or more aspects of the present disclosure.
Figure 8:
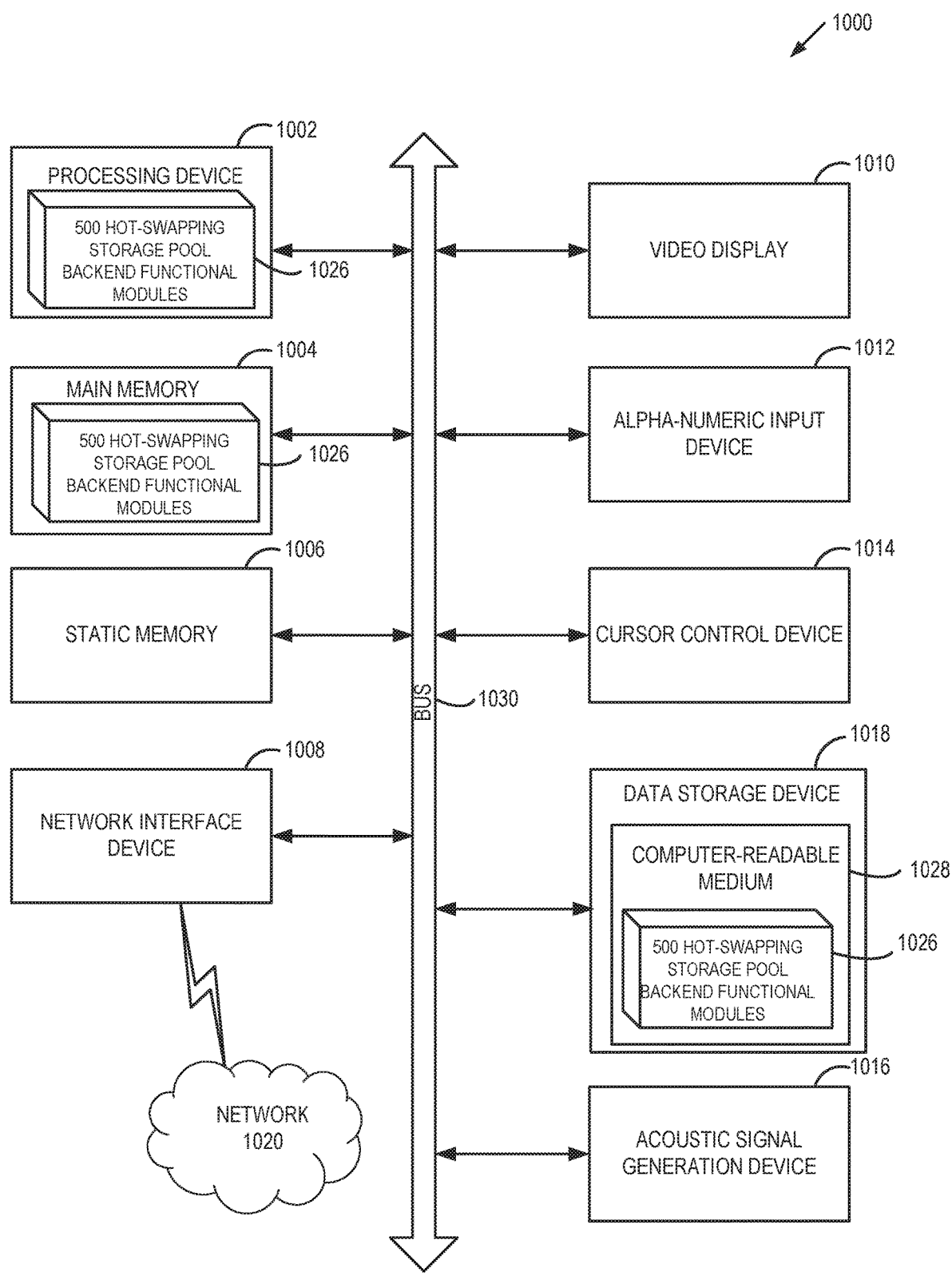
FIG. 8 depicts a block diagram of an illustrative computing device operating in accordance with the examples of the present disclosure.

FIG. 7 depicts a flow diagram of a method for hot-swapping storage pool backend functional modules of a host computer system, in accordance with one or more aspects of the present disclosure. Method 700 and/or each of its individual functions, routines, subroutines, or operations may be performed by one or more processing devices (e.g., one or more processing devices of computer system 100 of FIG. 1) executing the method. In certain implementations, method 700 may be performed by a single processing thread. Alternatively, method 700 may be performed by two or more processing threads, each thread executing one or more individual functions, routines, subroutines, or operations of the method. In an illustrative example, the processing threads implementing method 700 may be synchronized (e.g., using semaphores, critical sections, and/or other thread synchronization mechanisms). Alternatively, the processing threads implementing method 700 may be executed asynchronously with respect to each other.

At block 710, a processing device implementing the method may receive, from the virtualization manager, a message identifying a certain data format supported by one or more disk images stored by physical storage components of one or more storage domains. Alternatively, the host management module may identify the data format by refresh the storage metadata that is stored in the host memory. The refresh may be performed by the host management module responsive to receiving a message instructing the host management module to perform the refresh, or responsive to some other triggering event (e.g., timeout expiration).

At block 720, the processing device may identify a storage pool backend functional module that supports the identified data format. In certain implementations, the storage pool backend functional module may be compliant to a pre-defined call interface, as described in more details herein above.

At block 730, the processing device may, transparently for the virtual machine being executed by the host computer system, activate the identified storage pool backend functional module by directing, to the identified storage pool backend functional module, backend storage function calls. In certain implementations, activating the identified storage pool backend functional module comprises modifying a pointer to a backend storage function, as described in more details herein above. Responsive to completing the operations described with reference to block 730, the method may terminate. Upon completing the operations referenced by block 730, the method may terminate.

FIG. 7 schematically illustrates a component diagram of an example computer system 1000 which can perform any one or more of the methods described herein. In various illustrative examples, computer system 1000 may correspond to host computer system 115, 120 of FIG. 1.

Example computer system 1000 may be connected to other computer systems in a LAN, an intranet, an extranet, and/or the Internet. Computer system 1000 may operate in the capacity of a server in a client-server network environment. Computer system 1000 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

Processing device 1002 represents one or more general-purpose processing devices such as a microprocessor, central processing unit, or the like. More particularly, processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1002 may be configured to execute instructions of host management module 112 implementing methods 600, 700 for hot-swapping storage pool backend functional modules of a host computer system.

Example computer system 1000 may further comprise a network interface device 1008, which may communicatively coupled to a network 1020. Example computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 may include a computer-readable storage medium (or more specifically a non-transitory computer-readable storage medium) 1028 on which is stored one or more sets of executable instructions 1026. In accordance with one or more aspects of the present disclosure, executable instructions 1026 may comprise executable instructions encoding various functions of host management module 112, including methods 600, 700 for hot-swapping storage pool backend functional modules of a host computer system.

Executable instructions 1026 may also reside, completely or at least partially, within main memory 1004 and/or within processing device 1002 during execution thereof by example computer system 1000, main memory 1004 and processing device 1002 also constituting computer-readable storage media. Executable instructions 1026 may further be transmitted or received over a network via network interface device 1008.

While computer-readable storage medium 1028 is shown in FIG. 4 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method, comprising:
   responsive to detecting that a disk image of a virtual machine is modified in view of a particular data storage format, refreshing, by a processing device of a host computer system executing the virtual machine, storage metadata stored in a memory of the host computer system, wherein the refreshed storage metadata identifies the particular data storage format;
   identifying a storage pool backend functional module implementing the particular data storage format;
   activating the identified storage pool backend functional module; and
   directing a backend storage function call to the identified storage pool backend functional module, wherein the backend storage function call is associated with storing the disk image of the virtual machine.

2. The method of claim 1, further comprising:
   responsive to receiving an instruction initiated by a virtualization manager, modifying the disk image in view of the particular data storage format supported by the identified storage pool backend functional module.

3. The method of claim 1, further comprising:
transmitting, to a virtualization manager, a message comprising a status of activating the identified storage pool backend functional module.

4. The method of claim 1, wherein the storage pool backend functional module is compliant to a pre-defined call interface, the pre-defined call interface comprising definitions of one or more methods that are implemented by the storage pool backend functional module.

5. The method of claim 1, wherein the storage pool backend functional module is configured to store the storage metadata in a memory of the host computer system.

6. The method of claim 1, wherein the storage metadata comprises a parameter of a storage connection pool.

7. The method of claim 1, wherein activating the identified storage pool backend functional module is performed transparently for the virtual machine being executed by the host computer system.

8. A system comprising:
a memory; and
a processing device, coupled to the memory, the processing device to:
responsive to detecting that one or more disk images of a plurality of disk images of a virtual machine are to be modified in view of a particular data storage format, refresh storage metadata stored in the memory, wherein the refreshed storage metadata identifies a particular data storage format;
modifying the one or more disk images of the plurality of disk images in view of the particular data storage format;
transmit, to a virtualization manager, a message comprising a status of activating a storage pool backend functional module implementing the particular data storage format; and
direct a backend storage function call to the storage pool backend functional module implementing the particular data storage format, wherein the backend storage function call is associated with storing the one or more disk images of the virtual machine.

9. The system of claim 8, wherein the processing device is further to:
identify the storage pool backend functional module implementing the particular data storage format.

10. The system of claim 8, wherein the processing device is further to:
activate the storage pool backend functional module implementing the particular data storage format.

11. The system of claim 8, wherein the storage pool backend functional module is compliant to a pre-defined call interface, the pre-defined call interface comprising definitions of one or more methods that are implemented by the storage pool backend functional module.

12. The system of claim 8, wherein the storage metadata comprises a parameter of a storage connection pool.

13. A computer-readable non-transitory storage medium comprising executable instructions that, when executed by a processing device of a host computer system executing a virtual machine, cause the processing device to:
responsive to detecting that a disk image of a virtual machine is modified in view of a particular data storage format, refresh, by a processing device of a host computer system executing a virtual machine, storage metadata stored in a memory of the host computer system, wherein the refreshed storage metadata identifies the particular data storage format;
identify a storage pool backend functional module implementing the particular data storage format;
activate the identified storage pool backend functional module; and
direct a backend storage function call to the identified storage pool backend functional module, wherein the backend storage function call is associated with storing the disk image of the virtual machine.

14. The computer-readable non-transitory storage medium of claim 13, further comprising executable instructions that, when executed by the processing device, cause the processing device to:
responsive to receiving an instruction initiated by a virtualization manager, modify the disk image in view of the data storage format supported by the identified storage pool backend functional module.

15. The computer-readable non-transitory storage medium of claim 13, further comprising executable instructions that, when executed by the processing device, cause the processing device to:
transmit, to a virtualization manager, a message comprising a status of activating the identified storage pool backend functional module.

16. The computer-readable non-transitory storage medium of claim 13, wherein the storage pool backend functional module is compliant to a pre-defined call interface, the pre-defined call interface comprising definitions of one or more methods that are implemented by the storage pool backend functional module.

17. The computer-readable non-transitory storage medium of claim 13, wherein the storage pool backend functional module is configured to store the storage metadata in a memory of the host computer system.

18. The computer-readable non-transitory storage medium of claim 13, wherein the storage metadata comprises a parameter of a storage connection pool.

19. The computer-readable non-transitory storage medium of claim 13, wherein activating the identified storage pool backend functional module is performed transparently for the virtual machine being executed by the host computer system.

* * * * *